US012437715B2

(12) United States Patent
Zhu

(10) Patent No.: US 12,437,715 B2
(45) Date of Patent: Oct. 7, 2025

(54) DISPLAY APPARATUS, PIXEL CIRCUIT, AND METHOD FOR DRIVING PIXEL CIRCUIT

(71) Applicants: Chongqing BOE Display Technology Co., Ltd., Chongqing (CN); BOE Technology Group Co., Ltd., Beijing (CN)

(72) Inventor: Lei Zhu, Beijing (CN)

(73) Assignees: Chongqing BOE Display Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/290,793

(22) PCT Filed: Mar. 31, 2023

(86) PCT No.: PCT/CN2023/085450
§ 371 (c)(1),
(2) Date: Jan. 21, 2024

(87) PCT Pub. No.: WO2024/197807
PCT Pub. Date: Oct. 3, 2024

(65) Prior Publication Data

US 2025/0095569 A1 Mar. 20, 2025

(51) Int. Cl.
*G09G 3/3233* (2016.01)

(52) U.S. Cl.
CPC ... *G09G 3/3233* (2013.01); *G09G 2300/0852* (2013.01); *G09G 2310/061* (2013.01); *G09G 2310/08* (2013.01)

(58) Field of Classification Search
CPC ......... G09G 3/3233; G09G 2300/0852; G09G 2310/061; G09G 2310/08

(Continued)

(56) References Cited

U.S. PATENT DOCUMENTS 10,984,723 B1 * 4/2021 Zhou .................... G09G 3/3258
2019/0259331 A1 8/2019 Na (Continued)

FOREIGN PATENT DOCUMENTS

CN 106023889 A 10/2016
CN 111276102 A 6/2020

(Continued)

OTHER PUBLICATIONS

PCT/CN2023/085450 international search report dated Dec. 26, 2023.

(Continued)

*Primary Examiner* — Kwin Xie
(74) *Attorney, Agent, or Firm* — IPro, PLLC

(57) ABSTRACT

A display apparatus, a pixel circuit, and a method for driving a pixel circuit are provided. The pixel circuit comprises: a first storage sub-circuit, connected between a first node and a second node; a driving sub-circuit, used to control connection or disconnection between the third node and the fourth node under control of the first node; wherein the third node is connected to a first power supply terminal; a light-emitting control sub-circuit, used to control connection or disconnection between the fourth node and the first electrode of the sub-pixel; a second storage sub-circuit, used to store a potential of the first node; a data writing sub-circuit, used to input a voltage to the second node; and a compensation sub-circuit, used to control connection or disconnection between the first node and the third node under control of the first scanning signal terminal, or, used to control connection or disconnection between the first node and the fourth node under the control of the first scanning signal terminal. The present disclosure can improve the display effect.

20 Claims, 7 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 2021/0056895 | A1* | 2/2021 | Lee | G09G 3/3275 |
| 2021/0375206 | A1* | 12/2021 | Liu | G09G 3/3233 |
| 2022/0076618 | A1* | 3/2022 | Lai | G09G 3/3266 |
| 2022/0084466 | A1* | 3/2022 | Takatori | G09G 3/3233 |
| 2022/0101783 | A1* | 3/2022 | Han | G09G 3/32 |
| 2022/0122535 | A1* | 4/2022 | Jung | H10K 59/1213 |
| 2022/0173189 | A1* | 6/2022 | Kim | G09G 3/325 |
| 2022/0180810 | A1* | 6/2022 | Zhang | G09G 3/3241 |
| 2022/0328003 | A1* | 10/2022 | Zhang | G09G 3/3233 |
| 2023/0008017 | A1* | 1/2023 | Lee | G09G 3/3258 |
| 2023/0096851 | A1* | 3/2023 | Liu | G09G 3/3426 345/55 |
| 2023/0154414 | A1* | 5/2023 | Liu | G09G 3/3283 345/212 |
| 2023/0298522 | A1* | 9/2023 | Kobayashi | G09G 3/3233 345/76 |

FOREIGN PATENT DOCUMENTS

| | | | |
|---|---|---|---|
| CN | 112581908 | A | 3/2021 |
| CN | 113487996 | A | 10/2021 |
| CN | 113724654 | A | 11/2021 |
| CN | 115527487 | A | 12/2022 |
| KR | 20180003387 | A | 1/2018 |

OTHER PUBLICATIONS

PCT/CN2023/085450 Written Opinion dated Dec. 26, 2023.
PCT/CN2024/084939 international search report dated May 8, 2024.
PCT/CN2024/084939 Written Opinion dated May 8, 2024.

* cited by examiner

DISPLAY APPARATUS, PIXEL CIRCUIT, AND METHOD FOR DRIVING PIXEL CIRCUIT

CROSS-REFERENCE TO RELATED APPLICATIONS

The present disclosure is a U.S. national phase of PCT Application No. PCT/CN2023/085450 filed on Mar. 31, 2023 which is hereby incorporated by reference in its entirety.

TECHNICAL FIELD

The present disclosure relates to a field of display technologies, and in particular to a display apparatus, a pixel circuit, and a method for driving a pixel circuit.

BACKGROUND

Organic electroluminescent displays are a new generation of display products after liquid crystal displays. The organic electroluminescent displays are gradually becoming a mainstream and leader in a display field, due to their performances, such as a superior color saturation, a fast response speed, foldability, lightness and thinness, and so on. The organic electroluminescent displays are still to be further improved.

SUMMARY

A purpose of the present disclosure is to provide a display apparatus, a pixel circuit, and a method for driving a pixel circuit, which can improve a display effect.

According to an aspect of the present disclosure, a pixel circuit is provided. The pixel circuit is applicable to a display apparatus and includes:

a first storage sub-circuit, connected between a first node and a second node;

a driving sub-circuit, connected to the first node, a third node, and a fourth node, to control connection or disconnection between the third node and the fourth node under control of the first node; where the third node is connected to a first power supply terminal;

a light-emitting control sub-circuit, connected to the fourth node and a first electrode of a sub-pixel, to control connection or disconnection between the fourth node and the first electrode of the sub-pixel;

a second storage sub-circuit, connected to the first node, to store a potential of the first node;

a data writing sub-circuit, connected to the second node, to input a voltage to the second node; and a compensation sub-circuit, connected to a first scanning signal terminal and the first node;

where the compensation sub-circuit is further connected to the third node, to control connection or disconnection between the first node and the third node under control of the first scanning signal terminal; or, the compensation sub-circuit is further connected to the fourth node, to control connection or disconnection between the first node and the fourth node under the control of the first scanning signal terminal.

Furthermore, in a display frame of the display apparatus, a driving process of the pixel circuit includes a compensation stage and a data writing stage; where the compensation stage is before the data writing stage;

in the compensation stage, the compensation sub-circuit controls the connection between the first node and the third node or the fourth node, the third node is connected to the first power supply terminal, and the data writing sub-circuit inputs a first voltage to the second node; and in the data writing stage, the data writing sub-circuit inputs a second voltage to the second node.

Furthermore, the data writing stage includes a first stage and a second stage;

in the first stage, the compensation sub-circuit controls the connection between the first node and the third node or the fourth node, the third node is connected to the first power supply terminal, and the data writing sub-circuit inputs the second voltage to the second node; and in the second stage, the compensation sub-circuit controls the disconnection between the first node and the third node or the fourth node, and the data writing sub-circuit inputs the second voltage to the second node.

Furthermore, the pixel circuit further includes:

a first reset sub-circuit, connected to a reset signal terminal, a first initialization signal terminal, and the first node, to control connection or disconnection between the first initialization signal terminal and the first node under control of the reset signal terminal.

Furthermore, the first reset sub-circuit includes:

a first reset transistor, where a control electrode of the first reset transistor is connected to the reset signal terminal, a first electrode of the first reset transistor is connected to the first initialization signal terminal, and a second electrode of the first reset transistor is connected to the first node.

Furthermore, the pixel circuit further includes:

a second reset sub-circuit, connected to the first scanning signal terminal, a second initialization signal terminal, and the first electrode of the sub-pixel, to control connection or disconnection between the second initialization signal terminal and the first electrode of the sub-pixel under the control of the first scanning signal terminal;

where the second reset sub-circuit includes:

a second reset transistor, where a control electrode of the second reset transistor is connected to the first scanning signal terminal, a first electrode of the second reset transistor is connected to the second initialization signal terminal, and a second electrode of the second reset transistor is connected to the first electrode of the sub-pixel.

Furthermore, the data writing sub-circuit includes:

a data writing transistor, where a control electrode of the data writing transistor is connected to a second scanning signal terminal, a first electrode of the data writing transistor is connected to a data signal terminal, and a second electrode of the data writing transistor is connected to the second node.

Furthermore, the driving sub-circuit includes:

a driving transistor, where a control electrode of the driving transistor is connected to the first node, a first electrode of the driving transistor is connected to the third node, and a second electrode of the driving transistor is connected to the fourth node.

Furthermore, the compensation sub-circuit includes:

a compensation transistor, where a control electrode of the compensation transistor is connected to the first scanning signal terminal, a first electrode of the compensation transistor is connected to the third node or the fourth node, and a second electrode of the compensation transistor is connected to the first node.

Furthermore, the light-emitting control sub-circuit is further connected to the first power supply terminal and the third node, to control connection or disconnection between the first power supply terminal and the third node.

Furthermore, the light-emitting control sub-circuit includes a first light-emitting control transistor connected in series between the first power supply terminal and the third node.

Furthermore, the light-emitting control sub-circuit further includes a second light-emitting control transistor connected in series between the fourth node and the first electrode of the sub-pixel.

Furthermore, the first storage sub-circuit includes a first capacitor and the second storage sub-circuit includes a second capacitor.

According to an aspect of the present disclosure, a method for driving a pixel circuit is provided. The method for driving a pixel circuit is applicable to the pixel circuit and includes:

- causing a driving sub-circuit to control connection or disconnection between a third node and a fourth node under control of a first node;
- causing a light-emitting control sub-circuit to control connection or disconnection between the fourth node and a first electrode of a sub-pixel;
- causing a second storage sub-circuit to store a potential of the first node;
- causing a data writing sub-circuit to input a voltage to a second node; and
- causing a compensation sub-circuit to control connection or disconnection between the first node and the third node under control of a first scanning signal terminal; or, causing the compensation sub-circuit to control connection or disconnection between the first node and the fourth node under the control of the first scanning signal terminal.

According to an aspect of the present disclosure, a display apparatus is provided. The display apparatus includes the pixel circuit and a sub-pixel connected to the pixel circuit.

The display apparatus, the pixel circuit, and the method for driving a pixel circuit of the present disclosure, in a driving process, cause the driving sub-circuit to control the connection between the third node and the fourth node, and cause the compensation sub-circuit to control the connection between the first node and the third node or the fourth node. Since the third node is connected to the first power supply terminal, the first node may be charged by the first power supply terminal to compensate for a threshold voltage of the driving sub-circuit, and then, a problem of a poor display effect caused by different threshold voltages may be solved, thereby improving the display effect.

Figure 1:
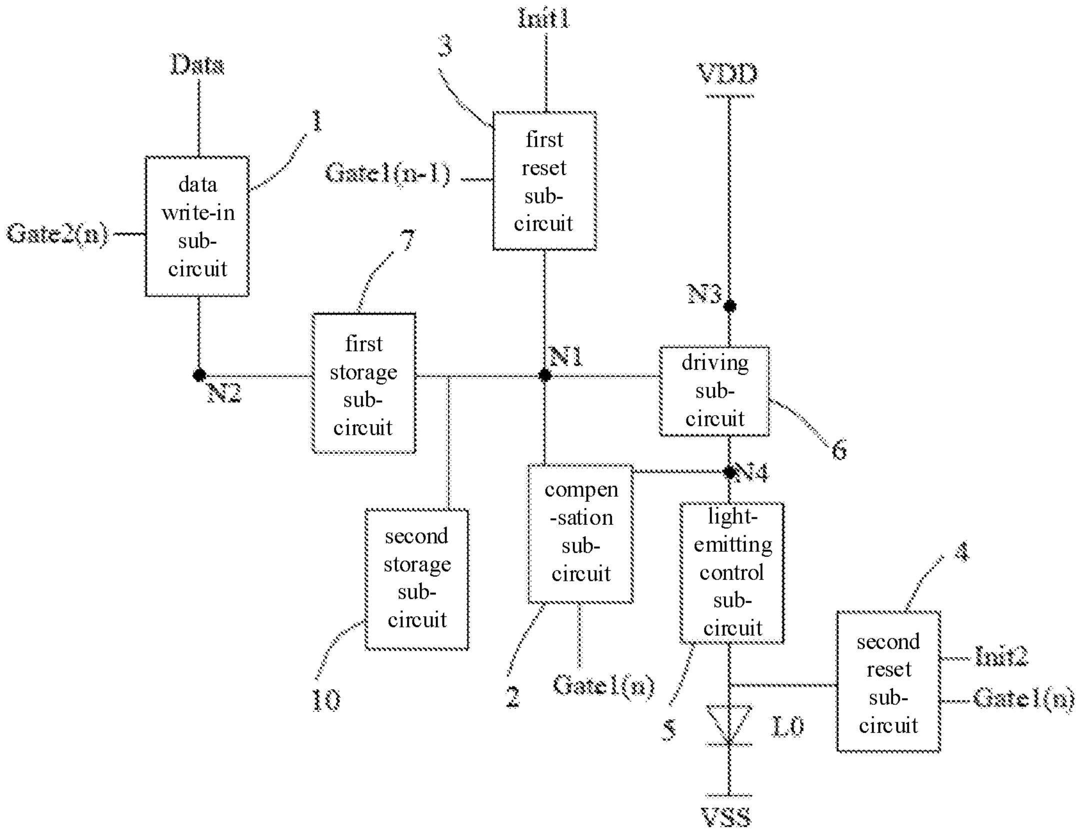
FIG. 1 is a structural diagram of a pixel circuit of an implementation of the present disclosure.

Reference signs description: 1. data writing sub-circuit; 2. compensation sub-circuit; 3. first reset sub-circuit; 4. second reset sub-circuit; 5. light-emitting control sub-circuit; 6. driving sub-circuit; 7. first storage sub-circuit; 8. sub-pixel row; 9. sub-pixel column; 10. second storage sub-circuit; EM1(*n*). first light-emitting control signal terminal; EM2(*n*). second light-emitting control signal terminal; Gate1(*n*−1). reset signal terminal; Gate1(*n*). first scanning signal terminal; Gate2(*n*). second scanning signal terminal; Init1. first initialization signal terminal; Init2. second initialization signal terminal; VDD. first power supply terminal; VSS. second power supply terminal; C1. first capacitor; C2. second capacitor; Data. data signal terminal; L0. sub-pixel; EM(n). light-emitting control signal terminal; EM(n−1). auxiliary control signal terminal; T1. first reset transistor; T2. compensation transistor; T3. driving transistor; T4. data writing transistor; T5. first light-emitting control transistor; T6. second light-emitting control transistor; T7. second reset transistor; N1. first node; N2. second node; N3. third node; N4. fourth node.

DETAILED DESCRIPTION

Exemplary implementations will be described in detail herein, and examples thereof are illustrated in accompanying drawings. When the following description involves the drawings, like numerals in different drawings refer to like or similar elements unless otherwise indicated. Implementations described in the following exemplary implementations do not represent all implementations consistent with the present disclosure. Rather, they are merely examples of apparatuses consistent with some aspects of the present disclosure as detailed in the appended claims.

Terms used in the present disclosure are merely for a purpose of describing specific implementations, and are not intended to limit the present disclosure. Unless otherwise defined, technical terms or scientific terms used in the present disclosure should have usual meanings understood by persons with general skills in the field to which the present disclosure belongs. Terms "first," "second," and similar terms used in the description and the claims of the present disclosure do not represent any order, quantity, or importance, but are only used to distinguish different components. Similarly, words such as "an" or "a" do not represent a quantity limit, but rather represent existence of at least one. "Multiple" or "several" represents two or more. Unless otherwise specified, words such as "forepart," "rear," "lower part," and/or "upside" are only for convenience of explanation and are not limited to a position or a spatial orientation. Words such as "including" or "containing" refer to that elements or objects appearing before "including" or "containing" include elements or objects appearing after "including" or "containing" and their equivalents, and do not exclude other elements or objects. When describing some embodiments, expressions of "connected" and "connecting" and their derivatives may be used. For example, the term "connecting" may be used when describing some embodiments, to indicate direct physical contact or electrical contact with each other between two or more components. For another example, the term "connecting" may be used when describing some embodiments, to indicate direct physical contact or electrical contact between two or more components. However, the term "connecting" may also indicate no direct contact with each other, but still cooperation or interaction with each other between two or more components. Singular forms, "a/an," "the," and "this," used in the description and the appended claims of the present disclosure are also intended to include majority forms, unless the context clearly indicates other meanings. It should also be understood that the term "and/or" used herein refers to and includes any or all possible combinations of one or more related listed items.

Transistors used in the present disclosure may all be triodes, thin film transistors, field-effect transistors, or other devices with same characteristics. In embodiments of the present disclosure, to distinguish between two electrodes of a transistor except for a control electrode thereof, one electrode thereof is referred to as a first electrode and the other electrode thereof is referred to as a second electrode.

In a practical operation, when the transistor is a triode, the control electrode may be a base electrode, the first electrode may be a collector electrode, and the second electrode may be an emitter electrode; or, the control electrode may be the base electrode, the first electrode may be the emitter electrode, and the second electrode may be the collector electrode.

In the practical operation, when the transistor is the thin film transistor or field-effect transistor, the control electrode may be a gate electrode, the first electrode may be a drain electrode, and the second electrode may be a source electrode; or, the control electrode may be the gate electrode, the first electrode may be the source electrode, and the second electrode may be the drain electrode. When the transistor is the thin film transistor, the thin film transistor may be an N-type thin film transistor or a P-type thin film transistor.

Figure 10:
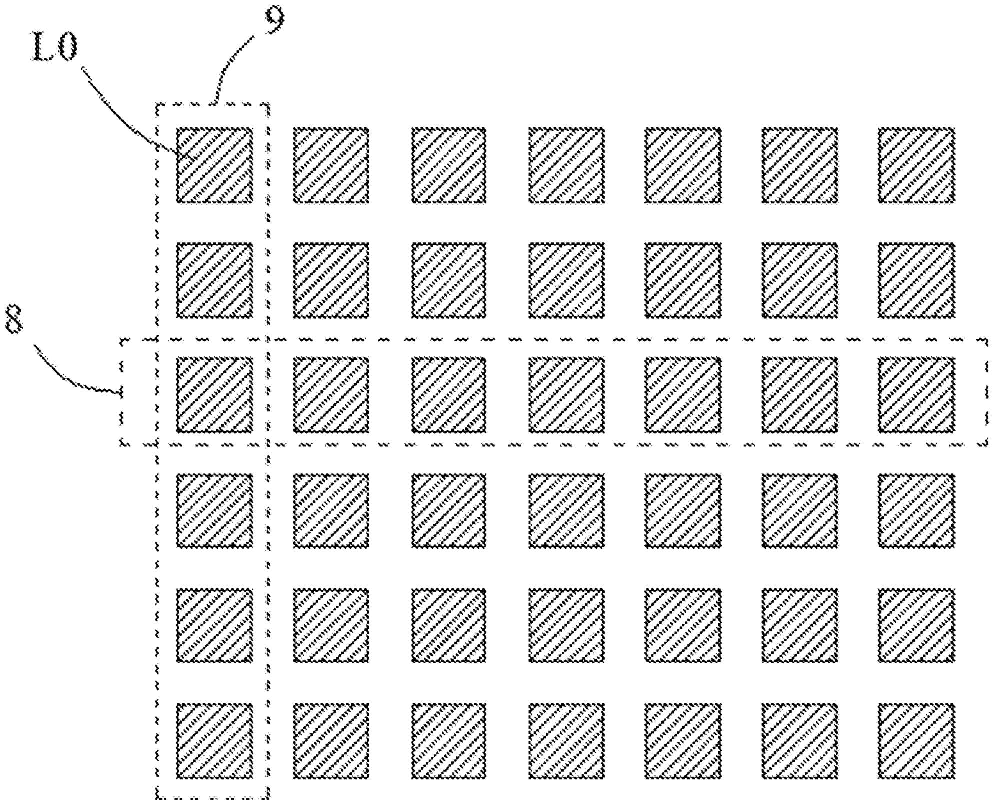
FIG. 10 is a schematic diagram of arrangement of sub-pixels of a display apparatus of an implementation of the present disclosure.

Implementations of the present disclosure provide a pixel circuit. The pixel circuit is applicable to a display apparatus. As shown in FIG. 10, the display apparatus may include multiple sub-pixels L0 and multiple pixel circuits. The multiple pixel circuits are connected one-to-one to the multiple sub-pixels L0. The multiple sub-pixels L0 include multiple first sub-pixels, multiple second sub-pixels, and multiple third sub-pixels. Light-emitting colors of the first sub-pixels, the second sub-pixels, and the third sub-pixels are different from each other. For example, the first sub-pixels emit red light, the second sub-pixels emit green light, and the third sub-pixels emit blue light. The above multiple sub-pixels L0 may be distributed in a manner of an array and form multiple sub-pixel rows 8 and multiple sub-pixel columns 9. A sub-pixel row 8 includes multiple sub-pixels L0 distributed along a row direction, and a sub-pixel column 9 includes multiple sub-pixels L0 distributed along a column direction. Where, a first sub-pixel, a second sub-pixel, and a third sub-pixel may form a pixel. The above multiple sub-pixels L0 may form multiple pixels.

As shown in FIG. 1, the pixel circuit may include a first storage sub-circuit 7, a driving sub-circuit 6, a light-emitting control sub-circuit 5, a second storage sub-circuit 10, a data writing sub-circuit 1, and a compensation sub-circuit 2.

The first storage sub-circuit 7 is connected between a first node N1 and a second node N2. The driving sub-circuit 6 is connected to the first node N1, a third node N3, and a fourth node N4, to control connection or disconnection between the third node N3 and the fourth node N4 under control of the first node N1. The third node N3 is connected to a first power supply terminal VDD. The light-emitting control sub-circuit 5 is connected to the fourth node N4 and a first electrode of a sub-pixel L0, to control connection or disconnection between the fourth node N4 and the first electrode of the sub-pixel L0. The second storage sub-circuit 10 is connected to the first node N1, to store a potential of the first node N1. The data writing sub-circuit 1 is connected to the second node N2, to input a voltage to the second node N2. The compensation sub-circuit 2 is connected to a first scanning signal terminal Gate1(*n*) and the first node N1. Where, the compensation sub-circuit 2 is further connected to the third node N3, to control connection or disconnection between the first node N1 and the third node N3 under control of the first scanning signal terminal Gate1(*n*); or, the compensation sub-circuit 2 is further connected to the fourth node N4, to control connection or disconnection between the first node N1 and the fourth node N4 under the control of the first scanning signal terminal Gate1(*n*).

The pixel circuit of the implementations of the present disclosure, in a driving process, causes the driving sub-circuit 6 to control the connection between the third node N3 and the fourth node N4, and causes the compensation sub-circuit 2 to control the connection between the first node N1 and the third node N3 or the fourth node N4. Since the third node N3 is connected to the first power supply terminal VDD, the first node N1 may be charged by the first power supply terminal VDD to compensate for a threshold voltage of the driving sub-circuit 6, and then, a problem of a poor display effect caused by different threshold voltages may be solved, thereby improving the display effect.

Each of parts of the pixel circuit of the implementations of the present disclosure is explained in detail below.

Figure 2:
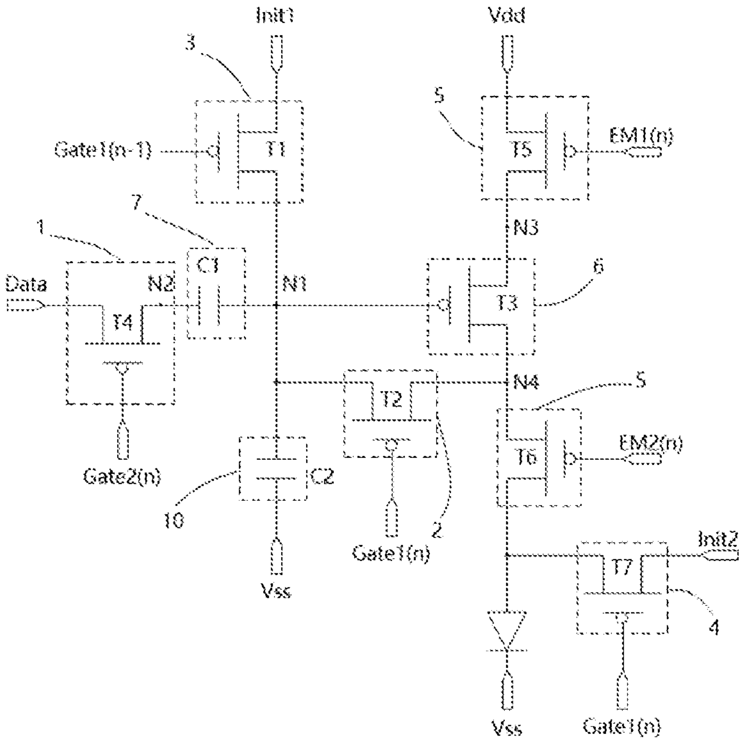
FIG. 2 is a circuit diagram of a pixel circuit of an implementation of the present disclosure.

As shown in FIGS. 1 and 2, the first storage sub-circuit 7 is connected between the first node N1 and the second node N2. For example, the first storage sub-circuit 7 may include a first capacitor C1. A first electrode of the first capacitor C1 is connected to the first node N1, and a second electrode of the first capacitor C1 is connected to the second node N2.

As shown in FIGS. 1 and 2, the driving sub-circuit 6 is connected to the first node N1, the third node N3, and the fourth node N4, to control the connection or the disconnection between the third node N3 and the fourth node N4 under the control of the first node N1. For example, the driving sub-circuit 6 may include a driving transistor T3. A control electrode of the driving transistor T3 is connected to the first node N1, a first electrode of the driving transistor T3 is connected to the third node N3, and a second electrode of the driving transistor T3 is connected to the fourth node N4. The third node N3 may be connected to the first power supply terminal VDD.

As shown in FIGS. 1 and 2, the data writing sub-circuit 1 is connected to the second node N2, to input the voltage to the second node N2. For example, the data writing sub-circuit 1 may include a data writing transistor T4. A control electrode of the data writing transistor T4 is connected to a second scanning signal terminal Gate2(*n*), a first electrode of the data writing transistor T4 is connected to a data signal terminal Data, and a second electrode of the data writing transistor T4 is connected to the second node N2. For multiple pixel circuits that are connected one-to-one to multiple sub-pixels L0 in a sub-pixel row 8, a second scanning signal terminal Gate2(*n*) connected to a data writing sub-circuit 1 of each of the multiple pixel circuits may be connected to a same signal line. For two pixel circuits that are connected one-to-one to two sub-pixels L0 in different sub-pixel rows 8, second scanning signal terminals Gate2(*n*)

connected to data writing sub-circuits 1 of the two pixel circuits are connected to different signal lines.

As shown in FIGS. 1 and 2, the pixel circuit of the present disclosure may further include a first reset sub-circuit 3. The first reset sub-circuit 3 is connected to a reset signal terminal Gate1(*n*−1), a first initialization signal terminal Init1, and the first node N1, to control connection or disconnection between the first initialization signal terminal Init1 and the first node N1 under control of the reset signal terminal Gate1(*n*−1). For example, the first reset sub-circuit 3 may include a first reset transistor T1. A control electrode of the first reset transistor T1 is connected to the reset signal terminal Gate1(*n*−1), a first electrode of the first reset transistor T1 is connected to the first initialization signal terminal Init1, and a second electrode of the first reset transistor T1 is connected to the first node N1.

As shown in FIGS. 1 and 2, the pixel circuit of the present disclosure may further include a second reset sub-circuit 4. The second reset sub-circuit 4 is connected to the first scanning signal terminal Gate1(*n*), a second initialization signal terminal Init2, and the first electrode of the sub-pixel L0, to control connection or disconnection between the second initialization signal terminal Init2 and the first electrode of the sub-pixel L0 under the control of the first scanning signal terminal Gate1(*n*). For example, the second reset sub-circuit 4 may include a second reset transistor T7. A control electrode of the second reset transistor T7 is connected to the first scanning signal terminal Gate1(*n*), a first electrode of the second reset transistor T7 is connected to the second initialization signal terminal Init2, and a second electrode of the second reset transistor T7 is connected to the first electrode of the sub-pixel L0. The multiple sub-pixel rows 8 include an (n−1)-th sub-pixel row and an n-th sub-pixel row that are adjacent to each other; where n is greater than or equal to 2. Pixel circuits connected to sub-pixels L0 in the (n−1)-th sub-pixel row are taken as an (n−1)-th level of pixel circuits, and pixel circuits connected to sub-pixels L0 in the n-th sub-pixel row are taken as an n-th level of pixel circuits. Reset signal terminals connected to first reset sub-circuits 3 in the n-th level of pixel circuits and first scanning signal terminals connected to second reset sub-circuits 4 in the (n−1)-th level of pixel circuits are connected to a same signal line.

As shown in FIGS. 1 and 2, the second storage sub-circuit 10 is connected to the first node N1, to store the potential of the first node N1. For example, the second storage sub-circuit 10 may include a second capacitor C2. A first electrode of the second capacitor C2 is connected to the first node N1, and a second electrode of the second capacitor C2 is connected to a second power supply terminal VSS.

Figure 8:
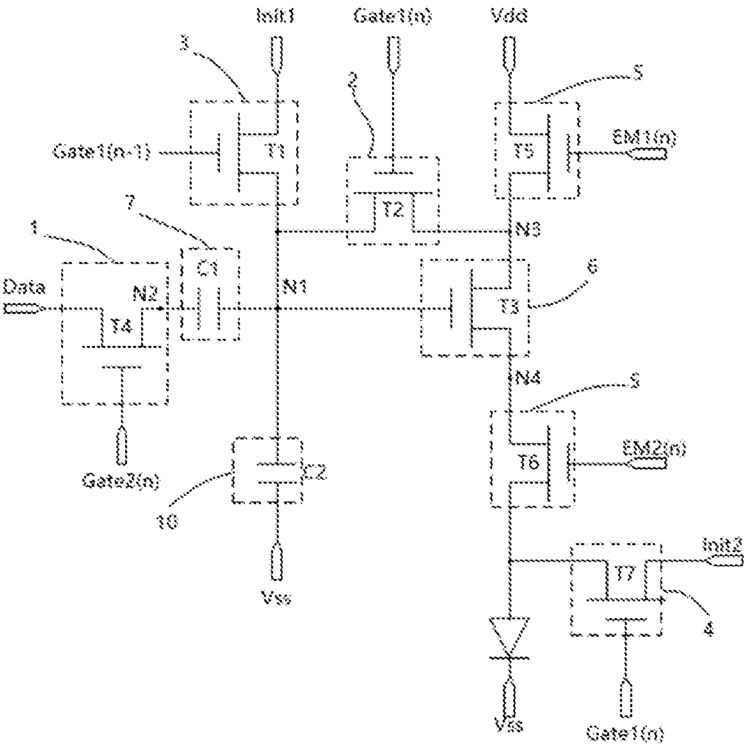
FIG. 8 is a yet another circuit diagram of a pixel circuit of an implementation of the present disclosure.

As shown in FIG. 8, the compensation sub-circuit 2 is connected to a first scanning signal terminal Gate1(*n*) and the first node N1. The compensation sub-circuit 2 is further connected to the third node N3, to control the connection or disconnection between the first node N1 and the third node N3 under the control of the first scanning signal terminal Gate1(*n*). For example, the compensation sub-circuit 2 includes a compensation transistor T2. A control electrode of the compensation transistor T2 is connected to the first scanning signal terminal Gate1(*n*), a first electrode of the compensation transistor T2 is connected to the third node N3, and a second electrode of the compensation transistor T2 is connected to the first node N1.

In another implementation, as shown in FIGS. 1 and 2, the compensation sub-circuit 2 is connected to the first scanning signal terminal Gate1(*n*), the first node N1, and the fourth node N4, to control the connection or disconnection between the first node N1 and the fourth node N4 under the control of the first scanning signal terminal Gate1(*n*). For example, the compensation sub-circuit 2 includes the compensation transistor T2. The control electrode of the compensation transistor T2 is connected to the first scanning signal terminal Gate1(*n*), the first electrode of the compensation transistor T2 is connected to the fourth node N4, and the second electrode of the compensation transistor T2 is connected to the first node N1.

Figure 6:
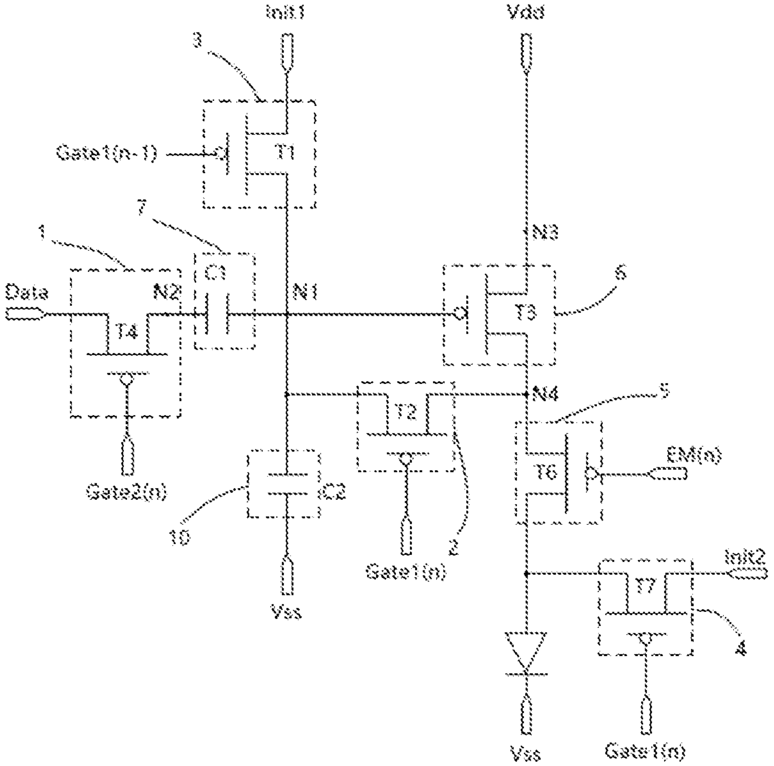
FIG. 6 is a still another circuit diagram of a pixel circuit of an implementation of the present disclosure.

As shown in FIGS. 1 and 6, the light-emitting control sub-circuit 5 is connected to the fourth node N4 and the first electrode of the sub-pixel L0, to control the connection or disconnection between the fourth node N4 and the first electrode of the sub-pixel L0. For example, the light-emitting control sub-circuit 5 may include a second light-emitting control transistor T6. A control electrode of the second light-emitting control transistor T6 is connected to a light-emitting control signal terminal EM(n), a first electrode of the second light-emitting control transistor T6 is connected to the fourth node N4, and a second electrode of the second light-emitting control transistor T6 is connected to the first electrode of the sub-pixel L0. A second electrode of the sub-pixel L0 may be connected to the second power supply terminal VSS.

In another implementation, as shown in FIG. 2, the light-emitting control sub-circuit 5 is connected to the first power supply terminal VDD, a first light-emitting control signal terminal EM1(*n*), the third node N3, the fourth node N4, a second light-emitting control signal terminal EM2(*n*), and the first electrode of the sub-pixel L0, to control connection or disconnection between the first power supply terminal VDD and the third node N3 under control of the first light-emitting control signal terminal EM1(*n*), and also to control the connection or disconnection between the fourth node N4 and the first electrode of the sub-pixel L0 under control of the second light-emitting control signal terminal EM2(*n*). For example, the light-emitting control sub-circuit 5 may include a first light-emitting control transistor T5 and a second light-emitting control transistor T6. A control electrode of the first light-emitting control transistor T5 is connected to the first light-emitting control signal terminal EM1(*n*), and the first light-emitting control transistor T5 is connected in series between the first power supply terminal VDD and the third node N3. That is, a first electrode of the first light-emitting control transistor T5 is connected to the first power supply terminal VDD, and a second electrode of the first light-emitting control transistor T5 is connected to the third node N3. A control electrode of the second light-emitting control transistor T6 is connected to the second light-emitting control signal terminal EM2(*n*), and the second light-emitting control transistor T6 is connected in series between the fourth node N4 and the first electrode of the sub-pixel L0. That is, a first electrode of the second light-emitting control transistor T6 is connected to the fourth node N4, and a second electrode of the second light-emitting control transistor T6 is connected to the first electrode of the sub-pixel L0.

Figure 4:
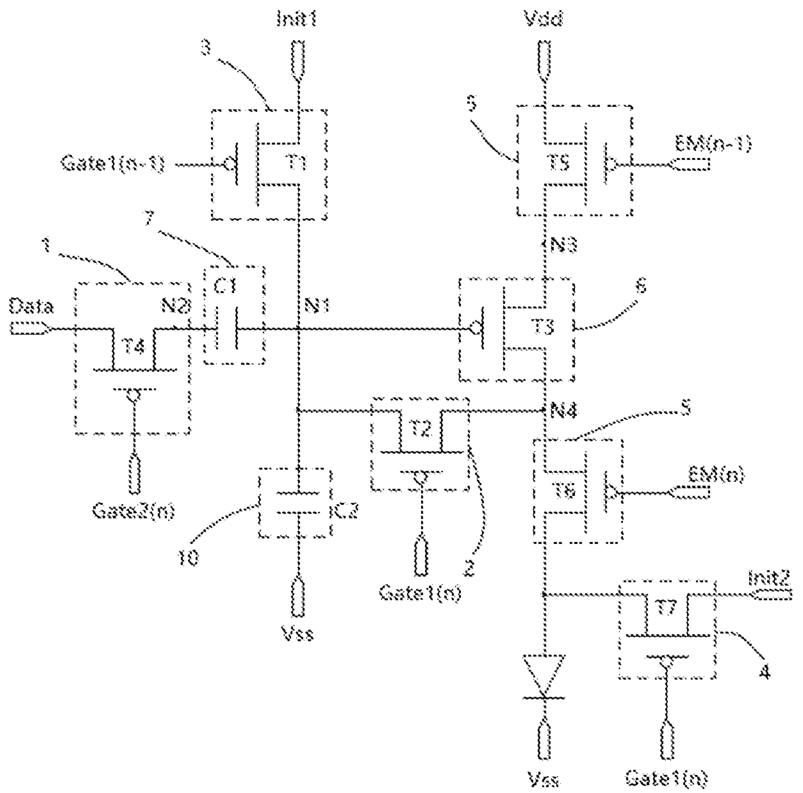
FIG. 4 is another circuit diagram of a pixel circuit of an implementation of the present disclosure.

In a still implementation, as shown in FIG. 4, the light-emitting control sub-circuit 5 is connected to the first power supply terminal VDD, an auxiliary control signal terminal EM1(*n*−1), the third node N3, the fourth node N4, the light-emitting control signal terminal EM(n), and the first electrode of the sub-pixel L0, to control the connection or disconnection between the first power supply terminal VDD and the third node N3 under control of the auxiliary control signal terminal EM(n−1), and also to control the connection or disconnection between the fourth node N4 and the first electrode of the sub-pixel L0 under control of the light-emitting control signal terminal EM(n). For example, the light-emitting control sub-circuit 5 may include a first light-emitting control transistor T5 and a second light-emitting control transistor T6. The control electrode of the first light-emitting control transistor T5 is connected to the auxiliary control signal terminal EM1(n−1), the first electrode of the first light-emitting control transistor T5 is connected to the first power supply terminal VDD, and the second electrode of the first light-emitting control transistor T5 is connected to the third node N3. The control electrode of the second light-emitting control transistor T6 is connected to the light-emitting control signal terminal EM(n), the first electrode of the second light-emitting control transistor T6 is connected to the fourth node N4, and the second electrode of the second light-emitting control transistor T6 is connected to the first electrode of the sub-pixel L0. Auxiliary control signal terminals connected to light-emitting control sub-circuits 5 in the above n-th level of pixel circuits and light-emitting control signal terminals connected to light-emitting control sub-circuits 5 in the (n−1)-th level of pixel circuits are connected to a same signal line.

Figure 3A:
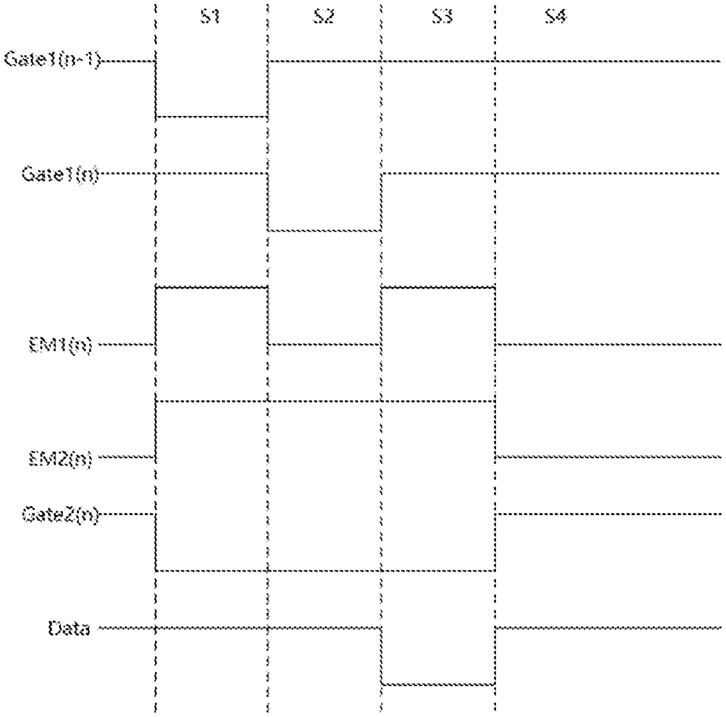
FIGS. 3*a*, 3*b*, and 3*c* are working timing diagrams of the pixel circuit shown in FIG. 2.
Figure 3B:
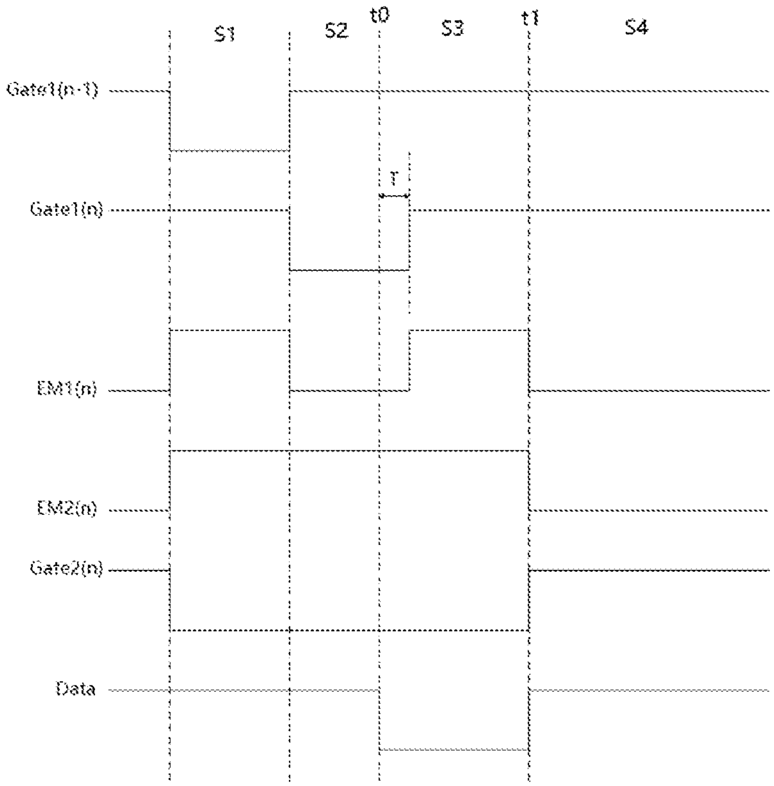
Figure 3C:
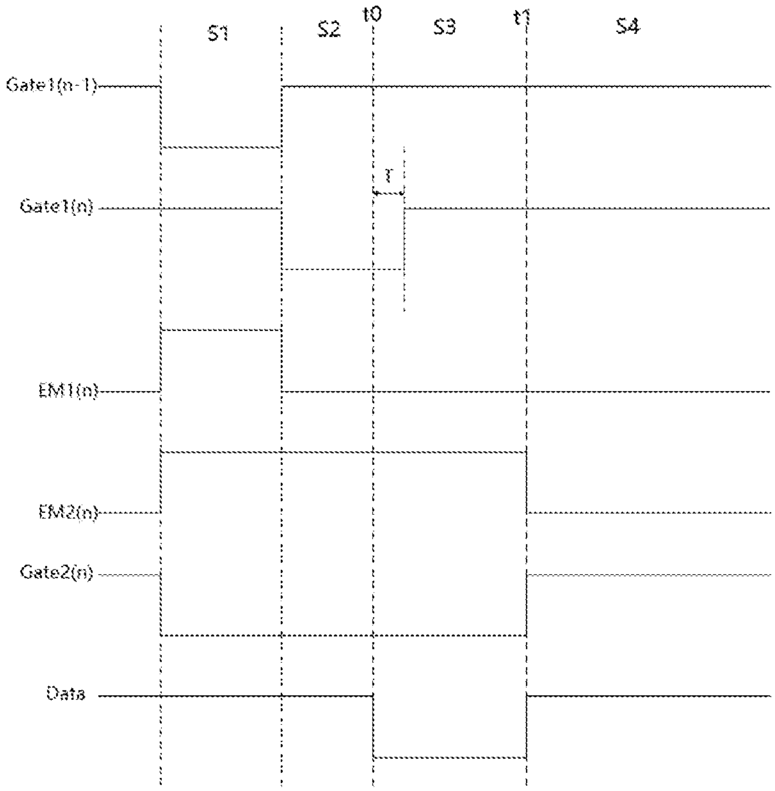

As shown in FIGS. 2 and 3(*a*), in a display frame of the display apparatus, the driving process of the pixel circuit includes an initialization stage S1, a compensation stage S2, a data writing stage S3, and a light-emitting stage S4. The initialization stage S1 is before the compensation stage S2, the compensation stage S2 is before the data writing stage S3, and the light-emitting stage S4 is after the data writing stage S3. In the compensation stage S2, the compensation sub-circuit 2 controls the connection between the first node N1 and the third node N3 or the fourth node N4, the third node N3 is connected to the first power supply terminal VDD, the first power supply terminal VDD charges the first node N1, and the data writing sub-circuit 1 inputs a first voltage to the second node N2. In the data writing stage S3, the data writing sub-circuit 1 inputs a second voltage to the second node N2. Furthermore, as shown in FIG. 3(*b*), the data writing stage S3 may include a first stage and a second stage. In the first stage (from a moment t0 to a moment (t0+T)), the compensation sub-circuit 2 controls the connection between the first node N1 and the third node N3 or the fourth node N4, the third node N3 is connected to the first power supply terminal VDD, and the data writing sub-circuit 1 inputs the second voltage to the second node N2. In the second stage (from the moment (t0+T) to a moment t1), the compensation sub-circuit 2 controls the disconnection between the first node N1 and the third node N3 or the fourth node N4, and the data writing sub-circuit 1 inputs the second voltage to the second node N2.

The working process of the pixel circuit in FIG. 2 is explained in detail below, in combination with the working timing diagram of the pixel circuit shown in FIG. 3(*a*). Where, taking the above transistor being a P-type transistor as an example, an on-level is a low level.

As shown in FIGS. 2 and 3(*a*), in the initialization stage S1, the first scanning signal terminal Gate1(*n*), the first light-emitting control signal terminal EM1(*n*), and the second light-emitting control signal terminal EM2(*n*) are high; the reset signal terminal Gate1(*n*−1) and the second scanning signal terminal Gate2(*n*) are low; the first reset transistor T1 is turned on; the potential VN1 of the first node N1 is written as Vinit1 by the first initialization signal terminal Init1; the data writing transistor T4 is turned on; the data signal terminal Data inputs the first voltage (VH) to the second node N2, that is, the potential VN2 of the second node N2 is written as VH by the data signal terminal Data; and a voltage across the first capacitor C1 is reset.

As shown in FIGS. 2 and 3(*a*), in the compensation stage S2, the reset signal terminal Gate1(*n*−1) and the second light-emitting control signal terminal EM2(*n*) are high; the first scanning signal terminal Gate1(*n*), the first light-emitting control signal terminal EM1(*n*), and the second scanning signal terminal Gate2(*n*) are low; the second reset transistor T7 is turned on; the first electrode of the sub-pixel L0 is reset; the first light-emitting control transistor T5, a driving transistor T3, and the compensation transistor T2 are turned on; the first power supply terminal VDD is connected to the first node N1; when the potential VN1 of the first node N1 is written as [Vdd+Vth (T3)], the driving transistor T3 is turned off, where Vdd is the potential of the first power supply terminal VDD; the data writing transistor T4 remains on; and the potential VN2 of the second node N2 remains VH.

As shown in FIGS. 2 and 3(*a*), in the data writing stage S3, the potential of the data signal terminal Data changes from the first voltage (VH) to the second voltage (VL); the reset signal terminal Gate1(*n*−1), the first scanning signal terminal Gate1(*n*), the first light-emitting control signal terminal EM1(*n*), and the second light-emitting control signal terminal EM2(*n*) are high; the second scanning signal terminal Gate2(*n*) is low; the data writing transistor T4 is turned on; the data signal terminal Data inputs the second voltage (VL) to the second node N2, that is, the potential VN2 of the second node N2 changes from VH to VL; and, under a coupling effect of the first capacitor C1, the potential VN1 of the first node N1 also changes, specifically as follows:

$$VN1 = Vdd + Vth + \Delta V * C1/(C1 + C2);$$

where Vth is a threshold voltage of the driving transistor, and ΔV is a change in the potential, from VH to VL, of the data signal terminal Data, that is, ΔV=VL−VH.

As shown in FIGS. 2 and 3(*a*), in the light-emitting stage S4, the reset signal terminal Gate1(*n*−1), the first scanning signal terminal Gate1(*n*), and the second scanning signal terminal Gate2(*n*) are high; the first light-emitting control signal terminal EM1(*n*) and the second light-emitting control signal terminal EM2(*n*) are low; the first light-emitting control transistor T5 and the second light-emitting control transistor T6 are turned on; and the sub-pixel L0 emits light.

In the light-emitting stage S4, a gate-source voltage of the driving transistor T3 is Vgs=VN1−Vdd=Vth+ΔV*C1/(C1+C2); and the driving transistor T3 works in a saturation region, and a calculation formula for a light-emitting current Ioled of the driving transistor T3 is:

$$Ioled = \frac{k}{2}(Vgs - Vth)^2 = \frac{k}{2}\left(\Delta V \times \frac{C1}{C1 + C2}\right)^2;$$

where there is k=μ*Cox*(W/L), μ is a mobility of the driving transistor T3, Cox is a gate oxide layer capacitance, and W/L is a width to length ratio of a channel of the driving transistor T3. From the calculation formula for Ioled, it can be seen that a size of Ioled is independent of the potential (Vdd) of the first power supply terminal VDD and the threshold voltage (Vth) of the driving transistor T3. Therefore, compensation is achieved for the potential (Vdd) of the first power supply terminal VDD and the threshold voltage (Vth) of the driving transistor T3, which may result in better display uniformity.

The working process of the pixel circuit in FIG. 2 is explained in detail below, in combination with the working timing diagram of the pixel circuit shown in FIG. 3(*b*). Where, taking the above transistor being the P-type transistor as an example, the on-level is the low level.

As shown in FIGS. 2 and 3(*b*), in the initialization stage S1, the first scanning signal terminal Gate1(*n*), the first light-emitting control signal terminal EM1(*n*), and the second light-emitting control signal terminal EM2(*n*) are high; the reset signal terminal Gate1(*n*−1) and the second scanning signal terminal Gate2(*n*) are low; the first reset transistor T1 is turned on; the potential VN1 of the first node N1 is written as Vinit1 by the first initialization signal terminal Init1; the data writing transistor T4 is turned on; the data signal terminal Data inputs the first voltage (VH) to the second node N2, that is, the potential VN2 of the second node N2 is written as VH by the data signal terminal Data; and the voltage across the first capacitor C1 is reset.

As shown in FIGS. 2 and 3(*b*), in the compensation stage S2, the reset signal terminal Gate1(*n*−1) and the second light-emitting control signal terminal EM2(*n*) are high; the first scanning signal terminal Gate1(*n*), the first light-emitting control signal terminal EM1(*n*), and the second scanning signal terminal Gate2(*n*) are low; the second reset transistor T7 is turned on; the first electrode of the sub-pixel L0 is reset; the first light-emitting control transistor T5, the driving transistor T3, and the compensation transistor T2 are turned on; the first power supply terminal VDD is connected to the first node N1; when the potential VN1 of the first node N1 is written as [Vdd+Vth (T3)], the driving transistor T3 is turned off; the data writing transistor T4 remains on; and the potential VN2 of the second node N2 remains VH. It can be seen that compared with the working timing diagram shown in FIG. 3(*a*), in the working timing diagram shown in FIG. 3(*b*), the working processes of the pixel circuit in the initialization stage S1 and compensation stage S2 are consistent with the working processes of the pixel circuit in the initialization stage S1 and compensation stage S2 in FIG. 3(*a*).

As shown in FIGS. 2 and 3(*b*), in the data writing stage S3, when t0<time t<(t0+T), the potential of the data signal terminal Data changes from the first voltage (VH) to the second voltage (VL), the second scanning signal terminal Gate2(*n*) is low, and the data writing transistor T4 is turned on. At the moment t0, the data signal terminal Data inputs the second voltage (VL) to the second node N2, that is, the potential VN2 of the second node N2 changes from VH to VL; and under the coupling effect of the first capacitor C1, the potential VN1(t0) of the first node N1 at the moment t0 also changes, specifically as follows:

$$VN1(t0) = Vdd + Vth + \Delta V * C1/(C1 + C2);$$

At the moment t0, the gate-source voltage Vgs of the driving transistor T3 is:

$$Vgs(t0) = VN1(t0) - Vdd = Vth + \Delta V * C1/(C1 + C2); \quad \text{formula 1}$$

where ΔV is a change in the potential, from VH to VL, of the data signal terminal Data, that is, ΔV=VL−VH.

When t0<time t<(t0+T), the first scanning signal terminal Gate1(*n*) and the first light-emitting control signal terminal EM1(*n*) remain low, and the first power supply terminal VDD continues to charge the first node N1. Where, the above first stage is a stage between the moment t0 and the moment (t0+T).

At the moment (t0+T), because the first power supply terminal VDD continues to charge the first node N1 within the time T, the potential VN1(t0+T) of the first node N1 at the moment (t0+T) increases by ΔW compared with VN1 (t0), specifically as follows:

$$VN1(t0 + T) = VN1(t0) + \Delta W = Vdd + Vth + \Delta V * C1/(C1 + C2) + \Delta W.$$

At the moment (t0+T), the gate-source voltage Vgs of the driving transistor T3 is:

$$Vgs(t0 + T) = VN(t0 + T) - Vdd = Vth + \Delta V * C1/(C1 + C2) + \Delta W. \quad \text{formula 2}$$

The following formula may be obtained from the formulas 1 and 2:

$$\Delta W = VN1(t0 + T) - VN1(t0) = Vgs(t0 + T) - Vgs(t0). \quad \text{formula 3}$$

The following formula may be obtained from according to charge conservation:

$$(C1 + C2)\frac{dVgs}{dt} + \frac{k}{2}(Vgs - Vth)^2 = 0. \quad \text{formula 4}$$

In the formula 4, there is k=μ*Cox*(W/L), μ is the mobility of the driving transistor T3, Cox is the gate oxide layer capacitance, and W/L is the width to length ratio of the channel of the driving transistor T3.

The following formula may be obtained by performing integration on the formula 4:

$$\int_{Vgs(t0)}^{Vgs(t0+T)} \frac{-1}{(Vgs - Vth)^2} dVgs = \int_{t0}^{t0+T} \frac{k}{2(C1 + C2)} dt. \quad \text{formula 5}$$

The following formula may be obtained from the formula 5:

$$Vgs(t0 + T) = Vth + \frac{1}{\left(\frac{kT}{2(C1 + C2)} + \frac{C1 + C2}{\Delta V * C1}\right)}. \quad \text{formula 6}$$

The following formula may be obtained from the formulas 1, 3, and 6:

$$\Delta W = \frac{1}{\left(\frac{kT}{2(C1 + C2)} + \frac{C1 + C2}{\Delta V * C1}\right)} - \frac{\Delta V * C1}{C1 + C2}.$$

Where, in the data writing stage S3, when the time t>(t0+T), the gate-source voltage of the driving transistor T3 remains unchanged. The above second stage is a stage, from the moment (t0+T) to an end moment (the moment t1), in the data writing stage S3.

As shown in FIGS. 2 and 3(*b*), in the light-emitting stage S4, the reset signal terminal Gate1(*n*−1), the first scanning signal terminal Gate1(*n*), and the second scanning signal terminal Gate2(*n*) are high; the first light-emitting control signal terminal EM1(*n*) and the second light-emitting control signal terminal EM2(*n*) are low; the first light-emitting control transistor T5 and the second light-emitting control transistor T6 are turned on; and the sub-pixel L0 emits light.

In the light-emitting stage S4, the gate-source voltage of the driving transistor T3 is:

$$Vgs - Vgs(t0+T) = Vth + \frac{1}{\left(\frac{kT}{2(C1+C2)} + \frac{C1+C2}{\Delta V * C1}\right)}; \quad \text{formula 7}$$

The driving transistor T3 works in the saturation region, and the calculation formula for the light-emitting current Ioled of the driving transistor T3 is:

$$Ioled = \frac{k}{2}(Vgs - Vth)^2 = \frac{k}{2}\left(\frac{1}{\left(\frac{kT}{2(C1+C2)}\right) + \frac{C1+C2}{\Delta V * C1}}\right)^2. \quad \text{formula 8}$$

In related technologies, when the mobility drifts, a value of the light-emitting current changes. For example, when the mobility increases, the light-emitting current increases. In the present disclosure, it can be seen from the formula 7 and the calculation formula for the light-emitting current Ioled that: when the mobility increases, the gate-source voltage Vgs of the driving transistor T3 decreases, thereby suppressing the increase of Ioled and achieving the compensation for the drift of the mobility, and an effect of the compensation may be adjusted by adjusting the size of the time T. Meanwhile, the size of Ioled is independent of the potential (Vdd) of the first power supply terminal VDD and the threshold voltage (Vth) of the driving transistor T3, and therefore, the compensation is achieved for the potential (Vdd) of the first power supply terminal VDD and the threshold voltage (Vth) of the driving transistor T3, which may result in better display uniformity.

The working process of the pixel circuit in FIG. 2 is explained in detail in combination with the working timing diagram of the pixel circuit shown in FIG. 3(*c*). Where, taking the above transistor being the P-type transistor as an example, the on-level is the low level. Compared with the working timing diagram shown in FIG. 3(*b*), in the working timing diagram shown in FIG. 3(*c*), the working process of the pixel circuit in the initialization stage S1 is consistent with the working process of the pixel circuit in the initialization stage S1 in FIG. 3(*b*); the working process of the pixel circuit in the compensation stage S2 is consistent with the working process of the pixel circuit in the compensation stage S2 in FIG. 3(*b*); and the working process of the pixel circuit in the first stage [from the moment t0 to the moment (t0+T)] of the data writing stage S3 is consistent with the working process of the pixel circuit in the first stage [from the moment t0 to the moment (t0+T)] of the data writing stage S3 in FIG. 3(*b*). In the second stage [from the moment (t0+T) to the moment t1] of the data writing stage S3, the first light-emitting control signal terminal EM1(*n*) is at the low level, and the first power supply terminal VDD is connected to the first electrode of the driving transistor T3. The gate-source voltage of the driving transistor T3 is shown in the above formula 6. In addition, in the working timing diagram shown in FIG. 3(*c*), the working process of the pixel circuit in the light-emitting stage S4 is consistent with the working process of the pixel circuit in the light-emitting stage S4 in FIG. 3(*b*), and the calculation formula for the light-emitting current is shown in the above formula 8.

Figure 5:
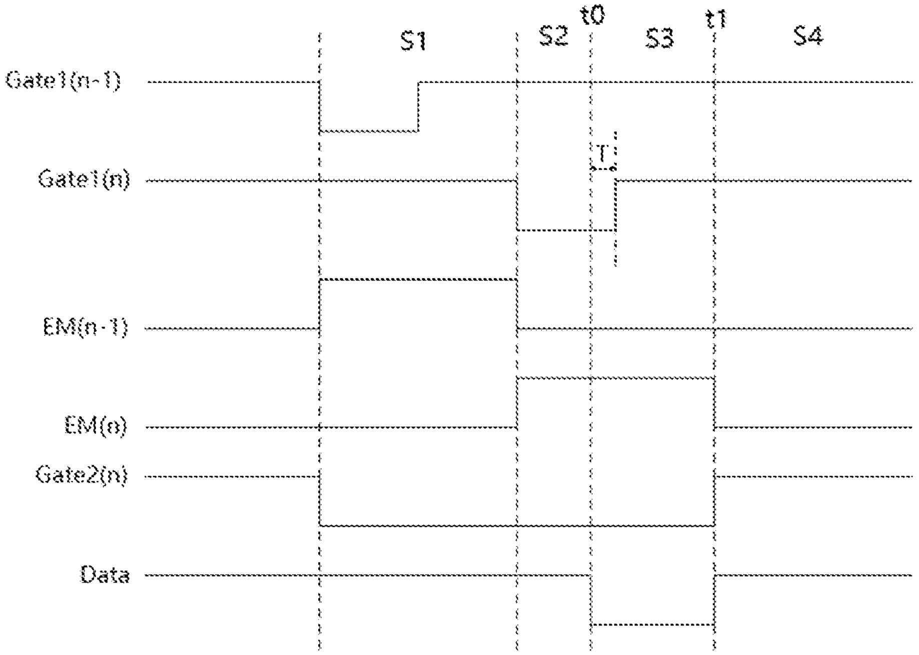
FIG. 5 is a working timing diagram of the pixel circuit shown in FIG. 4.

The working process of the pixel circuit in FIG. 4 is explained in detail in combination with the working timing diagram shown in FIG. 5. Where, taking the above transistor being the P-type transistor as an example, the on-level is the low level. Compared with the pixel circuit shown in FIG. 2, in the pixel circuit shown in FIG. 4, the control electrode of the first light-emitting control transistor T5 is connected to the auxiliary control signal terminal EM(n−1), and the control electrode of the second light-emitting control transistor T6 is connected to the light-emitting control signal terminal EM(n). The working processes of the pixel circuit shown in FIG. 4 are approximately same as the working processes of the pixel circuit shown in FIG. 2 [by working according to the working timing diagram shown in FIG. 3(*b*)], and the difference between the both is only that: in the initialization stage S1, the auxiliary control signal terminal EM(n−1) is high, the light-emitting control signal terminal EM(n) is low, and the second light-emitting control transistor T6 is turned on; in the compensation stage S2, the auxiliary control signal terminal EM(n−1) is low, the light-emitting control signal terminal EM(n) is high, and the first light-emitting control transistor T5 is turned on; in the data writing stage S3, the auxiliary control signal terminal EM(n−1) is low, the light-emitting control signal terminal EM(n) is high, and the first light-emitting control transistor T5 remains on; in the light-emitting stage S4, both the auxiliary control signal terminal EM(n−1) and the light-emitting control signal terminal EM(n) are low, both the first light-emitting control transistor T5 and the second light-emitting control transistor T6 are turned on, and the calculation formula for the light-emitting current is shown in the above formula 8.

Figure 7:
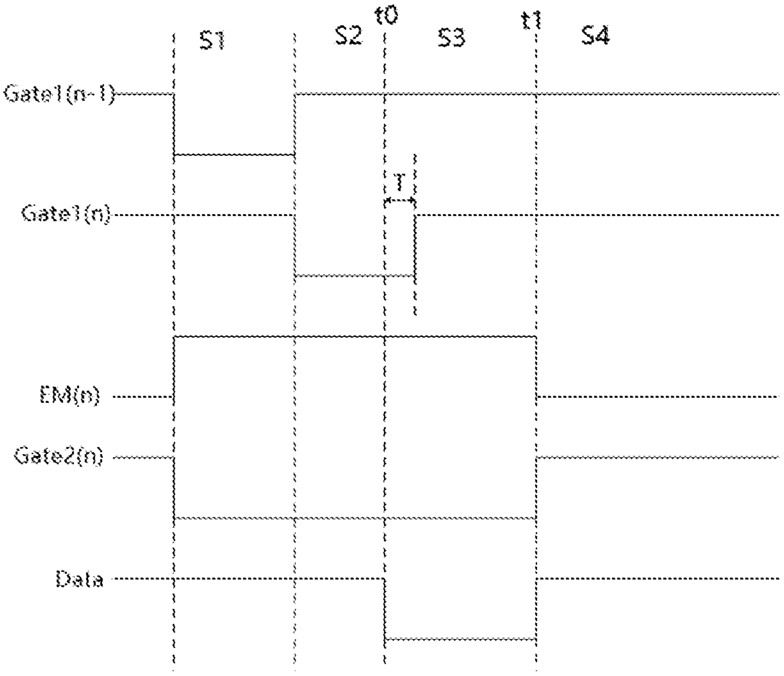
FIG. 7 is a working timing diagram of the pixel circuit shown in FIG. 6.

The working process of the pixel circuit in FIG. 6 is explained in detail in combination with the working timing diagram shown in FIG. 7. Where, taking the above transistor being the P-type transistor as an example, the on-level is the low level. Compared with the pixel circuit shown in FIG. 4, the first light-emitting control transistor T5 is not set in the pixel circuit shown in FIG. 6. The working processes of the pixel circuit shown in FIG. 6 are approximately same as the working processes of the pixel circuit shown in FIG. 4 [by working according to the working timing diagram shown in FIG. 5], and the difference between the both is only that: in the initialization stage S1, the light-emitting control signal terminal EM(n) is high, and the second light-emitting control transistor T6 is turned off. The calculation formula for the light-emitting current, of the sub-pixel L0, in the pixel circuit shown in FIG. 6 is shown in the above formula 8.

Figure 9:
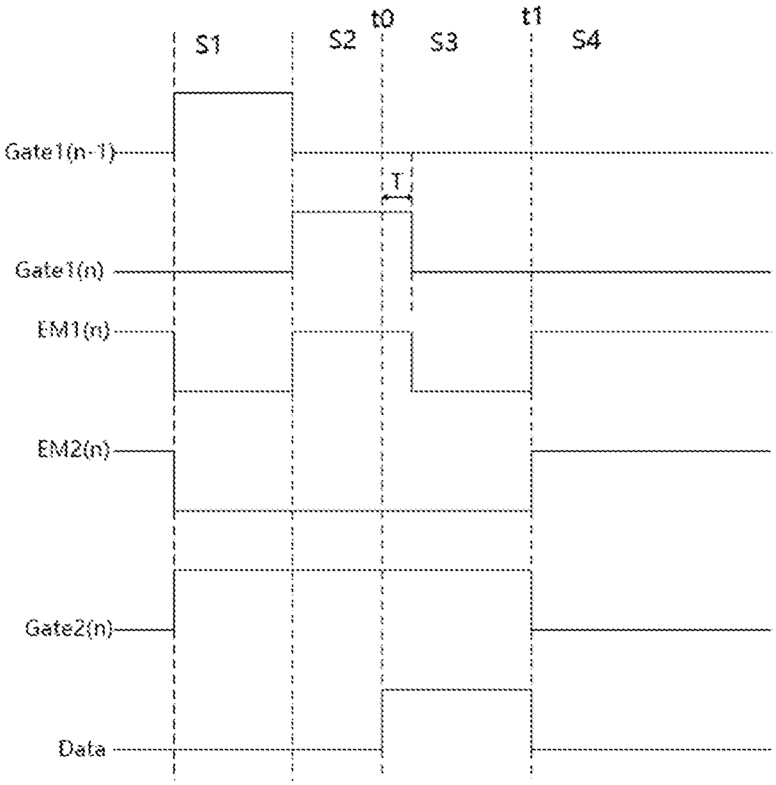
FIG. 9 is a working timing diagram of the pixel circuit shown in FIG. 8.

The working process of the pixel circuit in FIG. 8 is explained in detail in combination with the working timing diagram shown in FIG. 9. Where, taking the above transistor being the P-type transistor as an example, the on-level is a high level. The working process of the pixel circuit shown in FIG. 8 are approximately same as the working processes of the pixel circuit shown in FIG. 2 [by working according to the working sequence diagram shown in FIG. 3(*b*)], and the difference between the both is only that: when the compensation transistor T2 is turned on, the first node N1 is connected to the third node N3. The calculation formula for the light-emitting current Ioled, of the sub-pixel L0, in the pixel circuit shown in FIG. 8 is shown in the above formula 8. Furthermore, in FIG. 9, the above first voltage is VL and the second voltage is VH.

The implementations of the present disclosure further provide a method for driving a pixel circuit, to drive the pixel circuit in the above implementations. The method for driving a pixel circuit may include: causing a driving sub-circuit 6 to control connection or disconnection between a third node N3 and a fourth node N4 under control of a first node N1; causing a light-emitting control sub-circuit 5 to control connection or disconnection between the fourth node N4 and a first electrode of a sub-pixel L0; causing a second storage sub-circuit 10 to store a potential of the first node N1; causing a data writing sub-circuit 1 to input a voltage to a second node N2; and causing a compensation sub-circuit 2 to control connection or disconnection between the first node N1 and the third node N3 under control of a first scanning signal terminal Gate1($n$); or, causing the compensation sub-circuit 2 to control connection or disconnection between the first node N1 and the fourth node N4 under the control of the first scanning signal terminal Gate1($n$). The pixel circuit driven by the driving method of the implementations of the present disclosure is same as the pixel circuit in the above implementations, and therefore has the same beneficial effect, which will not be repeated here.

Implementations of the present disclosure further provide a display apparatus. The display apparatus may include: the above any pixel circuit and a sub-pixel L0 connected to the pixel circuit. The display apparatus may be any product or component with a display function, such as a portable phone, a smart phone, a video phone, a smart tablet, a smart watch, a tablet personal computer, a vehicle navigation system, a television, a computer display, a laptop computer, a head-mounted display, etc. The pixel circuit in the display apparatus of the implementations of the present disclosure is same as the pixel circuit in the above implementations, and therefore has the same beneficial effect, which will not be repeated here.

The above implementations are only preferred implementations of the present disclosure and do not impose any formal limitations on the present disclosure. Although the present disclosure has disclosed the above content through the preferred embodiments, the preferred embodiments are not intended to limit the present disclosure. Any technical personnel familiar with this profession may, without departing from scopes of technical solutions of the present disclosure, use the above disclosed technical content to make some modifications or embellishments to obtain equivalent implementations with equivalent changes. Any simple modifications, equivalent changes, and embellishments made to the above implementations based on technical substance of the present disclosure, which do not depart from the content of the technical solutions of the present disclosure, shall still fall within the scopes of the technical solutions of the present disclosure.

The invention claimed is:

1. A pixel circuit, applicable to a display apparatus and comprising:

a first storage sub-circuit, connected between a first node and a second node;

a driving sub-circuit, connected to the first node, a third node, and a fourth node, to control connection or disconnection between the third node and the fourth node under control of the first node; wherein the third node is connected to a first power supply terminal;

a light-emitting control sub-circuit, connected to the fourth node and a first electrode of a sub-pixel, to control connection or disconnection between the fourth node and the first electrode of the sub-pixel;

a second storage sub-circuit, connected to the first node, to store a potential of the first node;

a data writing sub-circuit, connected to the second node, to input a voltage to the second node, wherein the second node is disposed between the data writing sub-circuit and the first storage sub-circuit; and a compensation sub-circuit, connected to a first scanning signal terminal and the first node, wherein the compensation sub-circuit is directly connected to the first node;

wherein the compensation sub-circuit is further connected to the third node, to control connection or disconnection between the first node and the third node under control of the first scanning signal terminal; or, the compensation sub-circuit is further connected to the fourth node, to control connection or disconnection between the first node and the fourth node under the control of the first scanning signal terminal.

2. The pixel circuit of claim 1, wherein in a display frame of the display apparatus, a driving process of the pixel circuit comprises a compensation stage and a data writing stage;

in the compensation stage, the compensation sub-circuit controls the connection between the first node and the third node or the fourth node, the third node is connected to the first power supply terminal, and the data writing sub-circuit inputs a first voltage to the second node; and in the data writing stage, the data writing sub-circuit inputs a second voltage to the second node, wherein the first voltage is different from the second voltage.

3. The pixel circuit of claim 2, wherein the data writing stage comprises a first stage and a second stage;

in the first stage, the compensation sub-circuit controls the connection between the first node and the third node or the fourth node, the third node is connected to the first power supply terminal, and the data writing sub-circuit inputs the second voltage to the second node; and in the second stage, the compensation sub-circuit controls the disconnection between the first node and the third node or the fourth node, and the data writing sub-circuit inputs the second voltage to the second node.

4. The pixel circuit of claim 1, further comprising:

a first reset sub-circuit, connected to a reset signal terminal, a first initialization signal terminal, and the first node, to control connection or disconnection between the first initialization signal terminal and the first node under control of the reset signal terminal.

5. The pixel circuit of claim 4, wherein the first reset sub-circuit comprises:

a first reset transistor, wherein a control electrode of the first reset transistor is connected to the reset signal terminal, a first electrode of the first reset transistor is connected to the first initialization signal terminal, and a second electrode of the first reset transistor is connected to the first node.

6. The pixel circuit of claim 1, further comprising:

a second reset sub-circuit, connected to the first scanning signal terminal, a second initialization signal terminal, and the first electrode of the sub-pixel, to control connection or disconnection between the second initialization signal terminal and the first electrode of the sub-pixel under the control of the first scanning signal terminal;

wherein the second reset sub-circuit comprises:

a second reset transistor, wherein a control electrode of the second reset transistor is connected to the first scanning signal terminal, a first electrode of the second reset transistor is connected to the second initialization signal terminal, and a second electrode of the second reset transistor is connected to the first electrode of the sub-pixel.

7. The pixel circuit of claim 1, wherein the data writing sub-circuit comprises:

a data writing transistor, wherein a control electrode of the data writing transistor is connected to a second scanning signal terminal, a first electrode of the data writing transistor is connected to a data signal terminal, and a second electrode of the data writing transistor is connected to the second node.

8. The pixel circuit of claim 1, wherein the driving sub-circuit comprises:

a driving transistor, wherein a control electrode of the driving transistor is connected to the first node, a first electrode of the driving transistor is connected to the third node, and a second electrode of the driving transistor is connected to the fourth node.

9. The pixel circuit of claim 1, wherein the compensation sub-circuit comprises:

a compensation transistor, wherein a control electrode of the compensation transistor is connected to the first scanning signal terminal, a first electrode of the compensation transistor is connected to the third node or the fourth node, and a second electrode of the compensation transistor is connected to the first node.

10. The pixel circuit of claim 1, wherein the light-emitting control sub-circuit is further connected to the first power supply terminal and the third node, to control connection or disconnection between the first power supply terminal and the third node.

11. The pixel circuit of claim 10, wherein the light-emitting control sub-circuit comprises a first light-emitting control transistor connected in series between the first power supply terminal and the third node.

12. The pixel circuit of claim 1, wherein the light-emitting control sub-circuit further comprises a second light-emitting control transistor connected in series between the fourth node and the first electrode of the sub-pixel.

13. The pixel circuit of claim 1, wherein the first storage sub-circuit comprises a first capacitor and the second storage sub-circuit comprises a second capacitor, and the second capacitor comprises a first electrode connected to the first node and a second electrode connected to a second power supply terminal that is different from the first power supply terminal.

14. A method for driving a pixel circuit, comprising:

causing a driving sub-circuit to control connection or disconnection between a third node and a fourth node under control of a first node;

causing a light-emitting control sub-circuit to control connection or disconnection between the fourth node and a first electrode of a sub-pixel;

causing a second storage sub-circuit to store a potential of the first node;

causing a data writing sub-circuit to input a voltage to a second node; and causing a compensation sub-circuit to control connection or disconnection between the first node and the third node under control of a first scanning signal terminal; or, causing the compensation sub-circuit to control connection or disconnection between the first node and the fourth node under the control of the first scanning signal terminal;

wherein the pixel circuit is applicable to a display apparatus and comprises:

a first storage sub-circuit, connected between the first node and the second node;

the driving sub-circuit, connected to the first node, the third node, and the fourth node, to control the connection or the disconnection between the third node and the fourth node under the control of the first node; wherein the third node is connected to a first power supply terminal;

the light-emitting control sub-circuit, connected to the fourth node and the first electrode of the sub-pixel, to control the connection or the disconnection between the fourth node and the first electrode of the sub-pixel;

the second storage sub-circuit, connected to the first node, to store the potential of the first node;

the data writing sub-circuit, connected to the second node, to input the voltage to the second node, wherein the second node is disposed between the data writing sub-circuit and the first storage sub-circuit; and the compensation sub-circuit, connected to the first scanning signal terminal and the first node, wherein the compensation sub-circuit is directly connected to the first node;

wherein the compensation sub-circuit is further connected to the third node, to control the connection or the disconnection between the first node and the third node under the control of the first scanning signal terminal; or, the compensation sub-circuit is further connected to the fourth node, to control the connection or the disconnection between the first node and the fourth node under the control of the first scanning signal terminal.

15. A display apparatus, comprising: a pixel circuit and a sub-pixel connected to the pixel circuit;

wherein the pixel circuit comprises:

a first storage sub-circuit, connected between a first node and a second node;

a driving sub-circuit, connected to the first node, a third node, and a fourth node, to control connection or disconnection between the third node and the fourth node under control of the first node; wherein the third node is connected to a first power supply terminal;

a light-emitting control sub-circuit, connected to the fourth node and a first electrode of the sub-pixel, to control connection or disconnection between the fourth node and the first electrode of the sub-pixel;

a second storage sub-circuit, connected to the first node, to store a potential of the first node;

a data writing sub-circuit, connected to the second node, to input a voltage to the second node, wherein the second node is disposed between the data writing sub-circuit and the first storage sub-circuit; and a compensation sub-circuit, connected to a first scanning signal terminal and the first node, wherein the compensation sub-circuit is directly connected to the first node;

wherein the compensation sub-circuit is further connected to the third node, to control connection or disconnection between the first node and the third node under control of the first scanning signal terminal; or, the compensation sub-circuit is further connected to the fourth node, to control connection or disconnection between the first node and the fourth node under the control of the first scanning signal terminal.

16. The display apparatus of claim 15, wherein in a display frame of the display apparatus, a driving process of the pixel circuit comprises a compensation stage and a data writing stage;

in the compensation stage, the compensation sub-circuit controls the connection between the first node and the third node or the fourth node, the third node is connected to the first power supply terminal, and the data writing sub-circuit inputs a first voltage to the second node; and in the data writing stage, the data writing sub-circuit inputs a second voltage to the second node, wherein the first voltage is different from the second voltage.

17. The display apparatus of claim 16, wherein the data writing stage comprises a first stage and a second stage;

in the first stage, the compensation sub-circuit controls the connection between the first node and the third node or the fourth node, the third node is connected to the first power supply terminal, and the data writing sub-circuit inputs the second voltage to the second node; and in the second stage, the compensation sub-circuit controls the disconnection between the first node and the third node or the fourth node, and the data writing sub-circuit inputs the second voltage to the second node.

18. The display apparatus of claim 15, wherein the pixel circuit further comprises:

a first reset sub-circuit, connected to a reset signal terminal, a first initialization signal terminal, and the first node, to control connection or disconnection between the first initialization signal terminal and the first node under control of the reset signal terminal.

19. The display apparatus of claim 18, wherein the first reset sub-circuit comprises:

a first reset transistor, wherein a control electrode of the first reset transistor is connected to the reset signal terminal, a first electrode of the first reset transistor is connected to the first initialization signal terminal, and a second electrode of the first reset transistor is connected to the first node.

20. The display apparatus of claim 15, wherein the pixel circuit further comprises:

a second reset sub-circuit, connected to the first scanning signal terminal, a second initialization signal terminal, and the first electrode of the sub-pixel, to control connection or disconnection between the second initialization signal terminal and the first electrode of the sub-pixel under the control of the first scanning signal terminal;

wherein the second reset sub-circuit comprises:

a second reset transistor, wherein a control electrode of the second reset transistor is connected to the first scanning signal terminal, a first electrode of the second reset transistor is connected to the second initialization signal terminal, and a second electrode of the second reset transistor is connected to the first electrode of the sub-pixel.

* * * * *